(No Model.) 6 Sheets—Sheet 2.

J. F. DURYEA.
MOTOR VEHICLE.

No. 572,051. Patented Nov. 24, 1896.

Witnesses:
J. W. Garfield
H. I. Clemons

Inventor
James Frank Duryea,
by Chapin & Co
Attorneys.

(No Model.) 6 Sheets—Sheet 3.

J. F. DURYEA.
MOTOR VEHICLE.

No. 572,051. Patented Nov. 24, 1896.

(No Model.) 6 Sheets—Sheet 4.

J. F. DURYEA.
MOTOR VEHICLE.

No. 572,051. Patented Nov. 24, 1896.

Witnesses:
J. N. Gayfield
H. A. Clemons

Inventor,
James Frank Duryea,
by Chapin & Lee
Attorneys.

(No Model.) 6 Sheets—Sheet 6.

J. F. DURYEA.
MOTOR VEHICLE.

No. 572,051. Patented Nov. 24, 1896.

Witnesses:
J. D. Garfield
H. I. Clemons

Inventor,
James Frank Duryea
by Chapin & Co
Attorneys.

UNITED STATES PATENT OFFICE.

JAMES FRANK DURYEA, OF SPRINGFIELD, MASSACHUSETTS, ASSIGNOR TO THE DURYEA MOTOR WAGON COMPANY, OF SAME PLACE.

MOTOR-VEHICLE.

SPECIFICATION forming part of Letters Patent No. 572,051, dated November 24, 1896.

Application filed March 6, 1896. Serial No. 582,102. (No model.)

*To all whom it may concern:*

Be it known that I, JAMES FRANK DURYEA, a citizen of the United States of America, residing at Springfield, in the county of Hampden and State of Massachusetts, have invented new and useful Improvements in Motor-Vehicles, of which the following is a specification.

This invention relates to motor-vehicles driven by a gasolene or a similar vapor or gas engine, and has for its object the production of improved means for power transmission from the crank-shaft of the engine to the driving-axle of the vehicle, improved means for varying the speed of the said driving-axle and of reversing the same, and an improved construction of the speed-controlling and steering devices.

The invention consists in the peculiar construction and arrangement of the above mechanisms, all as hereinafter fully described, and pointed out in the claims.

In the drawings forming part of this specification.

Figure 1:
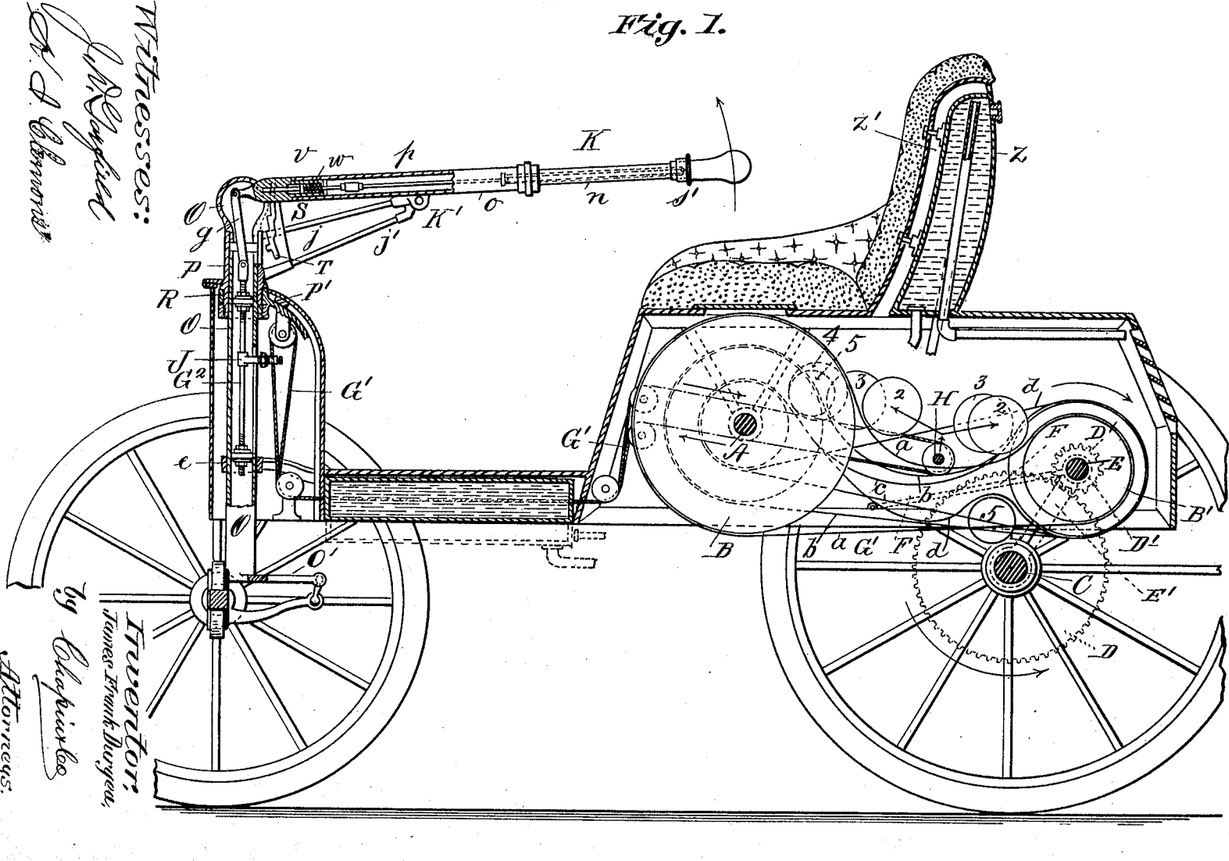
Figure 1 is a side elevation in section of a motor-vehicle containing my improvements, the power-transmitting devices being partly illustrated therein by diagrams.
Figure 2:
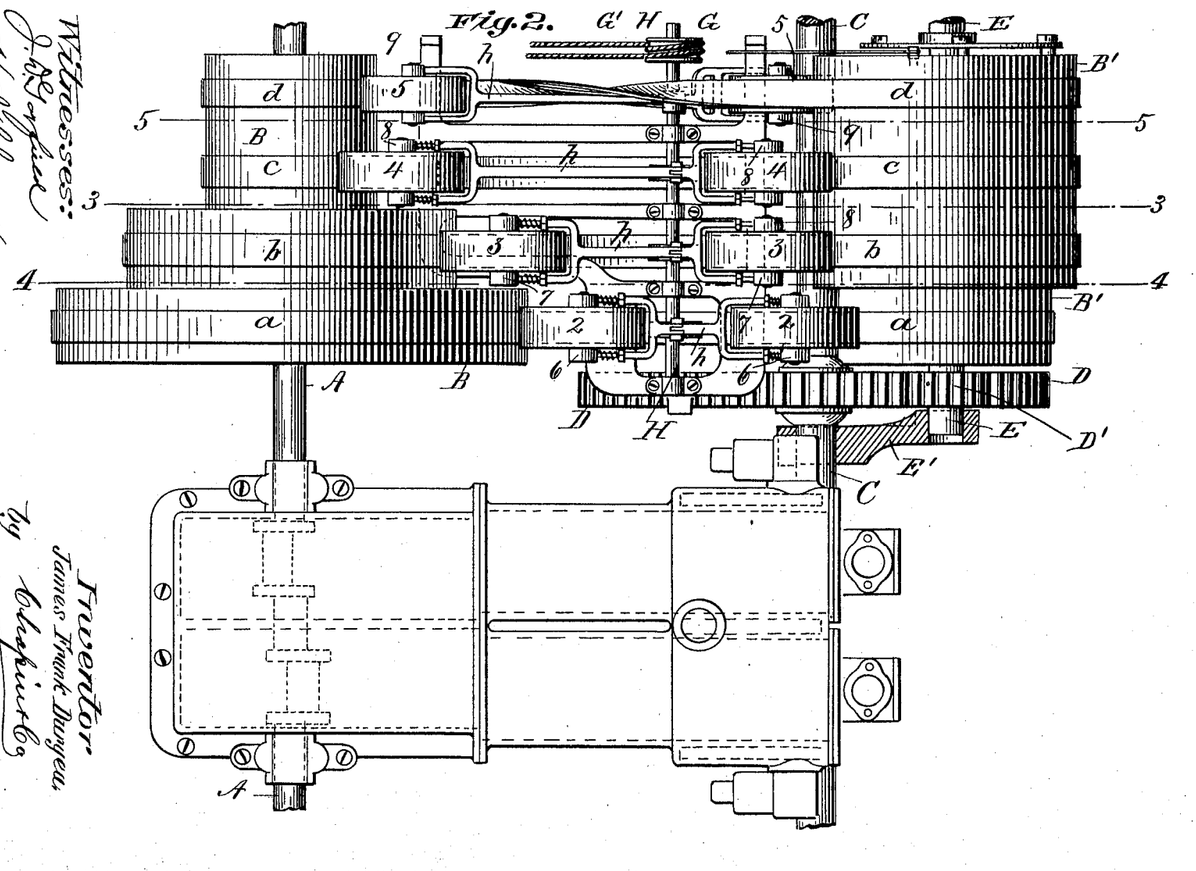
Fig. 2 is an enlarged plan view of the engine-frame and crank-shaft, the counter-shaft and driving-axle, and of the power-transmitting devices between the said crank-shaft and said counter-shaft.

The position of said engine relative to the other parts of the driving mechanism is shown in Fig. 2, and in Fig. 1 is shown the position of the gasolene-reservoir under the floor of the vehicle, having the usual connections with the engine common to this class of motors. Briefly stated, the driving mechanism of this vehicle consists of a cone-pulley mounted on the crank-shaft of any suitable motor or engine, a counter-shaft mounted in bearings on arms having bearings on the driving-axle, gear connections from said counter-shaft to said driving-axle, and belts from said cone-pulley to either a cylinder or an oppositely-stepped cone-pulley on the counter-shaft, as desired, and a series of idler-pulleys between the crank-shaft and counter-shaft pulleys operated by a cam-shaft located between them and parallel therewith and actuated by the controlling-lever under the hand of the operator, whereby an increased or decreased reversal of the speed is accomplished at the will of the operator.

Referring to the drawings, the body of the vehicle (shown in Fig. 1) is built of angle-iron to insure rigidity, and a suitable metal frame therein supports the engine and crank-shaft and its pulley. A represents said crank-shaft, (shown in Fig. 2,) and B the cone-pulley fixed thereon.

C is the driving-axle of the vehicle, having fixed thereon the gear D, in mesh with the pinion D' on the counter-shaft E. Said counter-shaft is supported by two arms E' in bearings on the upper extremity of said arms, the lower extremities thereof having bearings on said rear axle. Pivotally attached to said arms E', near their upper ends, are two brace-rods F, whose opposite ends are pivotally fixed to the frame of the vehicle. Thus it will be seen that the relative position of the counter-shaft E to the driving-axle C does not change and that any vertical movement of the wagon-body on its springs (to which body the engine and crank-shaft are secured) does not affect the counter-shaft and the gear connection between it and said axle.

H represents the speed-controlling cam-shaft, which is hung in suitable bearings on the vehicle-body about midway between said crank-shaft A and the counter-shaft E and parallel to said two shafts and provided on one end thereof with a spirally-grooved pulley G, around which a sufficient number of turns of the endless wire rope $G'$ are taken to permit of any desired degree of rotation of said cam-shaft H, the said endless rope leading from said pulley G forward over suitable guide-pulleys to a position near and parallel to the vertically-operating plunger $G^2$ in the steering-head O, and connected thereto by any suitable clamp, as J, whereby said vertical movements of plunger $G^2$ impart to said cam-shaft H rotational movements by means of the above-described connections. By the rotation of the cam-shaft H varying speeds are successively imparted to the counter-shaft, or the direction of movement of said shaft is reversed, as will be described in detail farther on.

Power from the engine is transmitted to the counter-shaft by means of belts passing from the cone-pulley B to and around the pulley $B'$ on said counter-shaft.

As aforesaid, the pulley $B'$ on the counter-shaft may be a cone-pulley, or, if desired, a a cylinder, according to the required degree of variation in the speed. Said belts are put on with considerable slack, as shown in Fig. 1, and pass under the cam-shaft H. On one end of the crank-shaft one of the belts is put on between it and the counter-shaft crossed, whereby the movement of the counter-shaft is reversed. In said Fig. 1 $a$ is the belt running from the largest diameter of the cone on the crank-shaft to the smallest diameter of the pulley on the counter-shaft. Beyond said belt $a$ are two belts $b$ and $c$, each for successive reductions of speed, and beyond these two belts is the crossed belt $d$, all of which are clearly shown in Fig. 2 and in outline in Fig. 1.

Supported on a suitable frame by arms pivotally secured on said frame are two idler-pulleys, one for impingement against the surface of the cone-pulley B and the other for like contact with the surface of the pulley $B'$ of the counter-shaft. A pair of these pulleys is provided for each of the belts $a$, $b$, $c$, and $d$, and are indicated by 2, 3, 4, and 5, (see Figs. 2, 3, 4, and 5,) and the arms supporting said pulleys are indicated by 6, 7, 8, and 9. A pair of toggle-arms $h$ are pivoted at a point 10 above the cam-shaft H and extend toward each of the idler-pulleys above mentioned and have a sliding engagement within the short hub 11 on the end of the arms 6, 7, 8, and 9. On each of said arms and near said hubs 11 are the adjusting-nuts 12, between which and the end of the said hubs the spiral springs 13 are compressed. The strength of these springs 13 determines the maximum of pressure with which the idler-pulleys may be forced against the belts. Two upstanding projections 14 on the top of said arms $h$, one on each side of the pivot 10, serve to hold each end of a spiral spring 15, which is distended between said projections. A forked lever $m$ (shown in Fig. 9) is pivoted at and depends from the pivot-point 10 of the arms $h$, the fork being astride of the cam-shaft H. On said forked lever is a cam-roll 16, against which the cam 17 operates to raise said lever $m$ and the pivoted ends of the toggle-arms $h$, whereby the idler-pulleys on the opposite ends of said arms are moved toward the cone-pulley B of the crank-shaft and $B'$ of the counter-shaft, impinging forcibly on the belts on said pulleys B and $B'$, causing them to grip the said pulleys tightly and impart a movement to the counter-shaft corresponding to the respective diameters of the driving-pulleys B and the counter-shaft pulley $B'$, whose belt is operated upon by the idler-pulleys. By means of said spring 15 the idler-pulleys are withdrawn from contact with their belts whenever one of the cams on shaft H passes out from under one of the cam-rolls 16 for the purpose of arresting the action of that belt.

The foregoing description applies to any one of the three sets of idlers and their belts $a$, $b$, and $c$, the construction and operation of the cam-shaft H and its cams being such that, beginning with the belt $c$, which imparts the slowest speed to the counter-shaft, each of the other belts $a$ and $b$ may be brought into successive operation, the idlers on $c$ being withdrawn from contact with that belt just previous to the application of the idlers above belt $b$ to that belt, whereby only one of said belts may be in operation on said counter-shaft at a time.

Of the belts $a$, $b$, and $c$ the driving side is from the under side of pulley B to the under side of pulley $B'$. The cross-belt $d$, driving from the bottom of pulley B to the top of pulley $B'$, thereby reverses the motion of said counter-shaft relative to the action of the other belts when said belt $d$ is brought into action by means above described. The arrangement of the toggle-arms $h$ for the operation of the idler-pulleys on said cross-belt $d$ is illustrated in Fig. 5, wherein the said arms are shown, one on the top of the frame and one on the bottom thereof, said toggle-arms passing diagonally from one pulley 5 to the other under cam-shaft H, and being operated upon by a cam fixed on said cam-shaft inversely to the cams operating the idlers for belts $a$, $b$, and $c$, and said cam being operated to engage its toggle-arms $h$ by a movement of the cam-shaft in a direction contrary to the direction of the arrows in Figs. 3 and 4.

Figures 7, 8, 9:
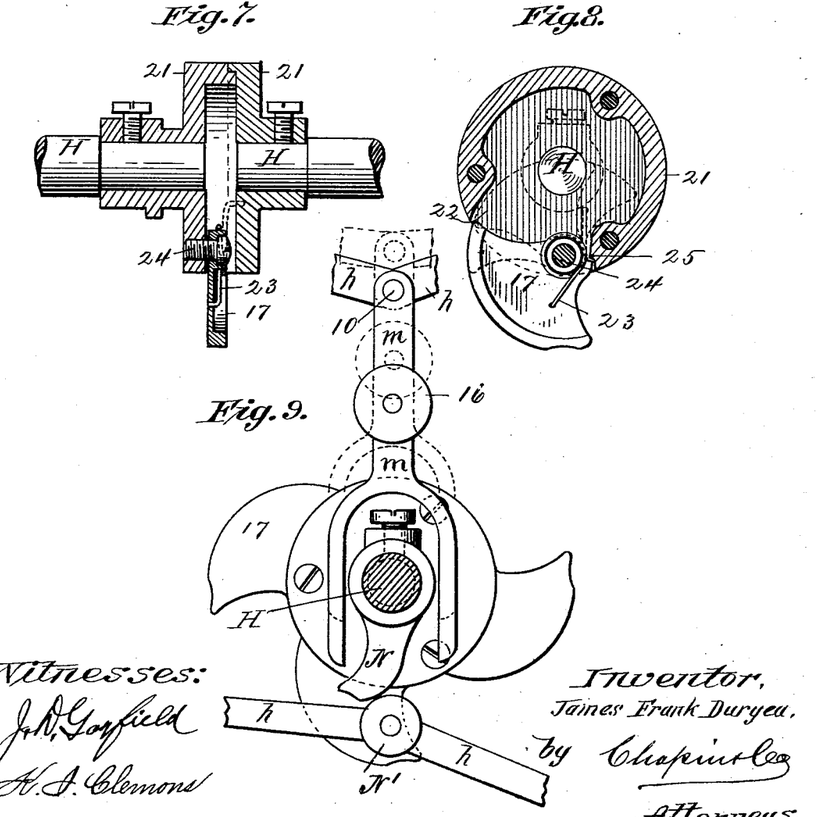
Fig. 7 is a sectional view of a portion of said cam-shaft on line 8 8, Fig. 6.
Fig. 8 is a sectional side elevation, taken on line 8 8 of Fig. 6, of one of the folding cams on said cam-shaft.
Fig. 9 is an end elevation of the said cam-shaft, said shaft being in section, and one of the levers operated on by the cams thereon and showing the reversing-cam.

The rotational movement of cam-shaft H is, as has been stated, under the control of the operating-lever at the hand of the driver on the seat of the carriage. The construction of said cam-shaft and its cams is such that said shaft can be rotated to apply the three varying degrees of speed to the counter-shaft from the lowest to the highest, and then the said shaft can be rotated in the opposite direction to apply the reverse motion to the counter-shaft without bringing into operation any one of the three sets of idler-pulleys during said return movement of the cam-shaft in the opposite direction, and is as follows:

The cam-shaft H is made up of three sections 18, 19, and 20. To the abutting ends of sections 18 19 and 19 20 are secured the hollow couplings 21. A sectional view of this construction is seen clearly in Fig. 7. Said couplings are secured face to face by screws, as shown in Figs. 8 and 9, and an opening 22 is made through the periphery of said coupling and communicating with the cavity therein, and within said cavity, between the faces of said couplings and near the periphery thereof, is pivoted at 24 the cam 17. A spring 23 is coiled around the hub of the cam and one end thereof made fast to said cam and the other end fixed to said coupling at any convenient point, whereby said cam may be pressed back within the cavity in the coupling against the action of the spring 23, which upon the release of the pressure holding said cam in the cavity immediately operates to throw it out again to the position shown in said Fig. 8, the position the cam occupies within the coupling 21 being indicated in dotted lines. The cam operating the idlers 2 2 is made fixed because, being the last cam to be applied, it never passes under and beyond its cam-roll and is consequently always in position to be withdrawn from its engagement with its cam-roll. Near the pivot 24 a shoulder 25 is provided in the coupling and a similar shoulder on the cam for engagement therewith, forming a point of resistance for said cam when it encounters the cam-roll 16 of the forked lever $m$ during the operation of raising the united ends of the toggle-arms to apply the idler-pulleys to the belt.

Figure 3:
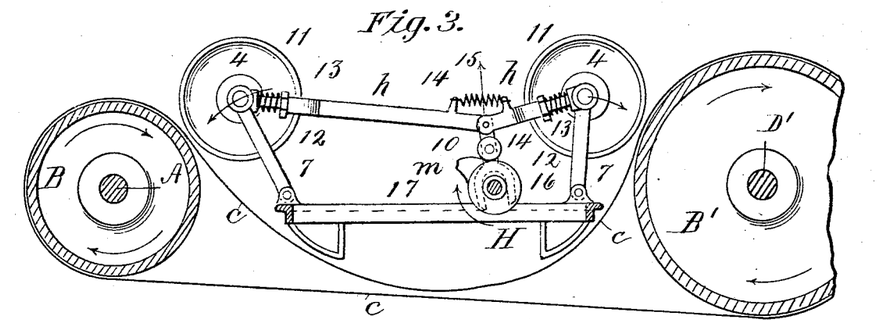
Figs. 3 and 4 show the construction and application of the power-transmitting devices to different-sized pulleys on the crank-shaft and the counter-shaft of the vehicle.
Figure 4:
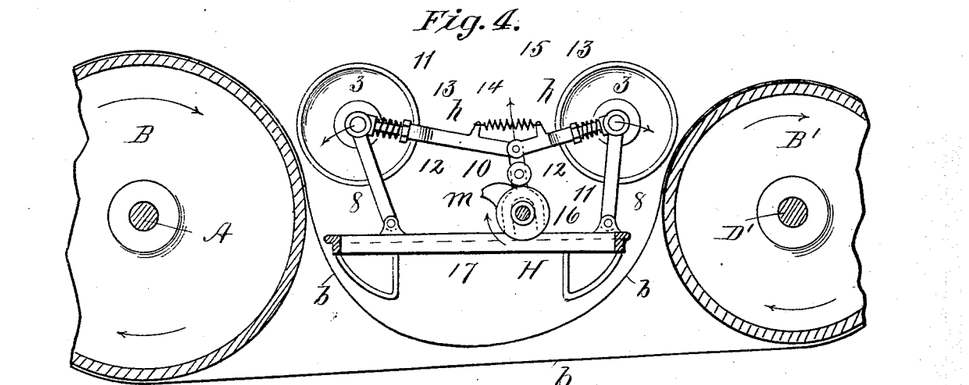
Figure 5:
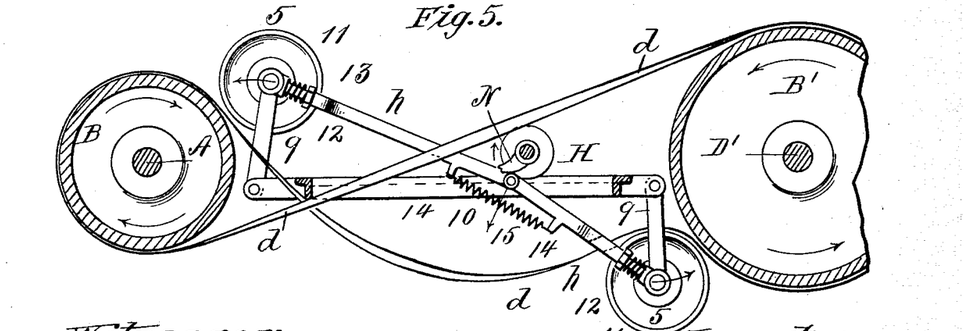
Fig. 5 shows the application of said devices to the said shafts whereby the direction of movement of the driving-axle is reversed.
Figure 6:
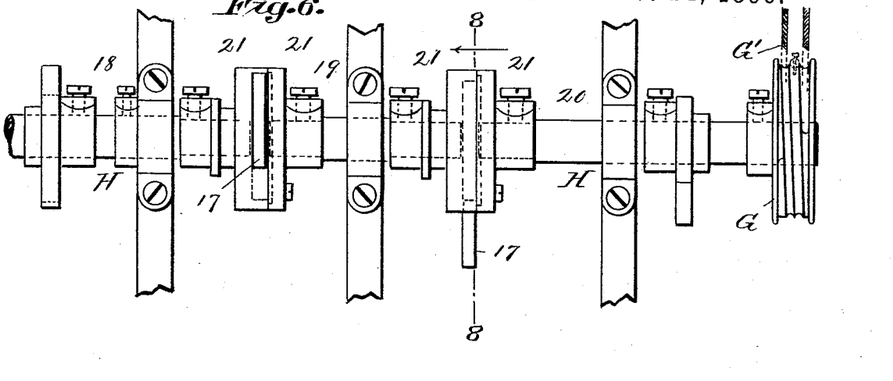
Fig. 6 shows the speed-controlling cam-shaft located between the crank-shaft and counter-shaft of the vehicle.

Assuming that, commencing with belt $c$, (the lowest speed,) all three of the cams have successively been brought into operation and it is desired to bring the parts to a position ready for a reversal of the movement of the counter-shaft, the handle of the operating-lever K, which is then locked in the position shown in Fig. 1—viz., at highest speed—is moved upward and by means of the rope G' and pulley G on shaft H revolves the said cam-shaft in a direction contrary to the arrows shown in Figs. 3 and 4. Then it will be seen that when the cam-shaft is so rotated the cams will disappear within their couplings as they in succession encounter the cam-rolls 16 and will be thrown out again into operative position by their springs 23 as soon as they have passed out from under said cam-rolls. It is apparent, therefore, that with the counter-shaft running at highest speed the parts can be brought to a position ready for reversal of movement of said counter without bringing into operation any of the intermediate speeds. In order to reverse the direction of movement of the counter-shaft, the cam N is provided and is secured to said shaft H in substantially the position shown in Fig. 9 and operates only on the toggle-arms $h$ of the cross-belt $d$, which occurs when the handle end of the operating-lever K is at its highest point.

As above described, the folding of the cams within the couplings allows said cam-shaft to be revolved in the direction necessary to bring said reversing-cam N into operation with its cam-roll N', which is accomplished by raising the handle of the operating-lever, as described above, and this operation can, if need be, be accomplished while the counter-shaft is running at full speed. In so raising said operating-lever the reverse-belt is not brought into action until the step $x^2$ of slot T has been passed by the locking-bolt $v$ within the lever K. The step or notch $x^2$ is the neutral point in the segment of a circle described by the forward end of the operating-lever K. That is to say, with the operating-lever at $x^2$ no motion is imparted to the counter-shaft B', and the forward end of the lever must be raised to start the carriage ahead and lowered to run it backward.

Figures 10, 11, 12, 13:
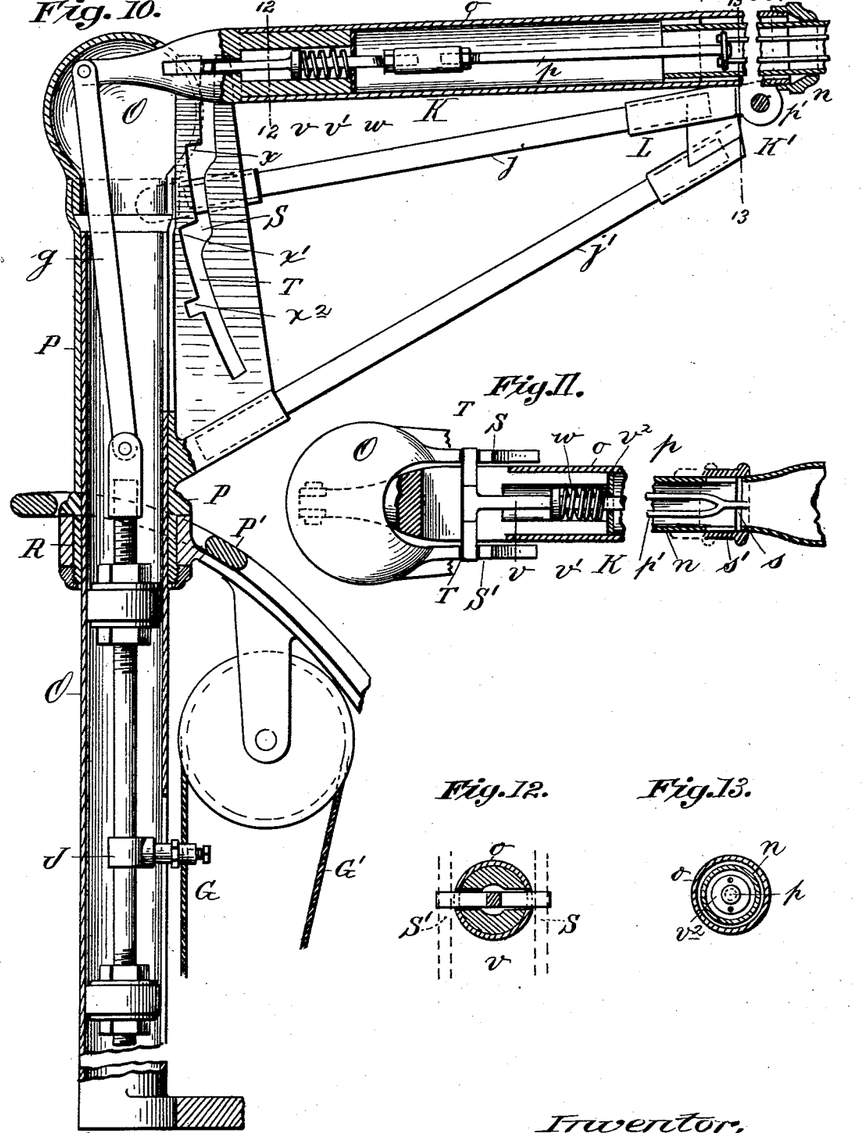
Fig. 10 is an enlarged sectional view of steering-head and controlling-lever supported thereon and a part of the connecting devices between said controlling-lever and the speed-controlling cam-shaft.
Fig. 11 is a plan view of the top of the steering-head and a part of the controlling-lever connected thereto.
Fig. 12 is a section of the controlling-lever, taken on line 12 12, Fig. 10.
Fig. 13 is a section of the said lever, taken on line 13 13, Fig. 10.

The steering-head O, as shown in Figs. 1 and 10, is tubular and is reinforced by the sleeve P at the upper end thereof, which may be shrunk on or otherwise united thereto. On the lower end of said sleeve is provided a bearing R within the frame P', which frame is fixed in any convenient manner to the frame of the vehicle. The lower end of said steering-head is held in vertical alinement with the bearing R by a suitable bearing $e$ in the frame of the vehicle, and within which it can freely rotate.

The lower extremity of the steering-head is provided with the arm O' at right angles to said head O, whereby by suitable connecting-rods to each front wheel the vehicle is steered. This feature of the construction is described and claimed in patent numbered 540,648 and dated June 11, 1895. Within the steering-head a plunger-rod $G^2$, having the two heads $f$ thereon for preventing a too free movement of said plunger in said head, is provided with an arm adjustable thereon, which projects through a slot within the side of the head and engages the endless wire rope G', connecting over suitable pulleys with the cam-shaft H, and whereby said shaft is given a rotatable movement in either direction. A suitable pitman $g$ connects the top of the plunger-rod $G^2$ with the end of the operating-lever K within the top of the head O. The said operating-lever K is pivotally supported at K' on a bracket consisting of the rods $j\ j'$, one end of which is fixed in the sleeve P, which is rotatably secured in the frame P', as described, and the opposite ends of which are fixed in a casting L, to which, by a lug on its under side, the said lever K is pivotally secured at K'. For the sake of convenience said lever K is made of two tubular pieces, one of which, $n$, telescopes within the portion $o$, said last-named portion being pivotally secured, as aforesaid, to the bracket by its connection at K'. At the extremity of the part $n$ of said lever is a suitable handle or grip. Within said lever K a jointed rod, comprising the portions $p\ p'$, is located, one end of said rod being fixed, by means of a pin $s$, to the ferrule $s'$, which has a sliding motion on said part $n$ of the lever K near said handle, (see Figs. 1 and 11,) a slot in said part $n$ for the pin $s$ limiting the movement of said ferrule. Said rod $p'$ is bifurcated for nearly its whole length, the two ends of the forked part being secured to a head $t$, which approximately fits the interior of the tubular part $n$ of the lever K. Between the ends of said forked rod $p'$, terminating in the head $t$, is provided an aperture for the reception of the rod $p$, and in which said rod has a free sliding movement, a suitable head being provided on the end of said rod either by upsetting said end or by putting a nut thereon, as shown. On the end of said rod toward the steering-head is secured, by a coupling with a check-nut on each side thereof, a T-headed piece $v$. (Shown in plan view in Fig. 11.) Said piece $v$ has a collar $v'$ thereon, between which and the fixed stop $v^2$ within the tubular part $o$ of the lever K the spring $w$ is compressed.

The end of the lever K which enters the steering-head is of cast-iron or other suitable metal, to which the part $o$ of said lever is attached. Said metal end is slotted transversely, as shown in Fig. 12, within which slot the transverse arms of the piece $v$ slide, and in which they are maintained in a horizontal position. Integral with the sleeve P are two upstanding arms S S', the separation between them being only sufficient for the operating-lever K to move freely therebetween. Within each of said arms S S' are the slots T, which slots are substantially concentric with the pivot K'. The arms of the T-headed lever $v$ are of sufficient length to engage the said slots T in the parts S S', as seen in Fig. 11. The forward edge of the slots T is provided with steps $x\ x'\ x^2$, with which the T-head of part $v$ engages as the handle of the operating-lever is moved to start or to increase the speed of the vehicle. The said engagement of the parts $x\ x'\ x^2$ with the head of the bolt $v$ renders impossible an inadvertent and sudden increase in the speed of the vehicle. For every increase of speed that is desired the hand of the operator must draw back the ferrule S' of the lever K to the position shown in Fig. 11, which frees the T-head of bolt $v$ from the steps $x$, $x'$, and $x^2$. When the part $v$ is thus held from engaging said steps, the spring $w$ is strongly compressed, and as soon as the operator releases the ferrule $s'$ said spring forces said head of the part $v$ again strongly against the forward edge of slots T. The step $x^2$ in said slots is a neutral point—viz., when the operating-lever K is supported by the engagement of the part $v$ in said notch all of the cams on the cam-shaft H are disengaged, the position of said shaft being substantially that shown in Fig. 9, wherein is shown the cam N about to depress the toggle-arms $h$, bringing pulleys 5 5 to bear on the cross-belt and reverse the counter-shaft E.

In Fig. 10 the position of the operating-lever is that which it occupies when the counter-shaft is running full speed ahead.

By moving the operating-lever very slowly and just bringing the idler-pulleys to bear lightly on the belt (under which conditions there would be considerable slip of said belt) a very slow speed ahead or at reverse can be obtained. It will be observed that no step is provided at the very bottom of the slots T, because when the T-head of part $v$ is in that position the vehicle is running backward, and it is deemed best to have the lever free to move instantly. Neither is a slot provided for locking said lever when the vehicle is at its highest speed for the same reasons that apply when the engine is backing. It is therefore necessary, when the carriage is at the highest speed or backing, that the driver should sustain the operating-lever in the position desired for such operations. A stop can be applied at any point within the slots T, which will limit the speed in either direction, as desired.

In order to remove the water-reservoir $z$, which supplies water to the jackets around the cylinders of the engine, as far as possible from the said engine, whereby it is kept cool for a longer period, it is utilized in this construction at the back of the seat in the carriage. An air-space $z'$ is provided between said reservoir and the upholstering, which may be of some good non-conductor, as asbestos, if desired. Said reservoir is made of metal and is provided with the usual supply, filling, and overflow pipes and is most advantageously utilized as regards space occupied and exposure of its largest surfaces to the air, whereby the temperature of the water therein is kept down.

Figure 14:
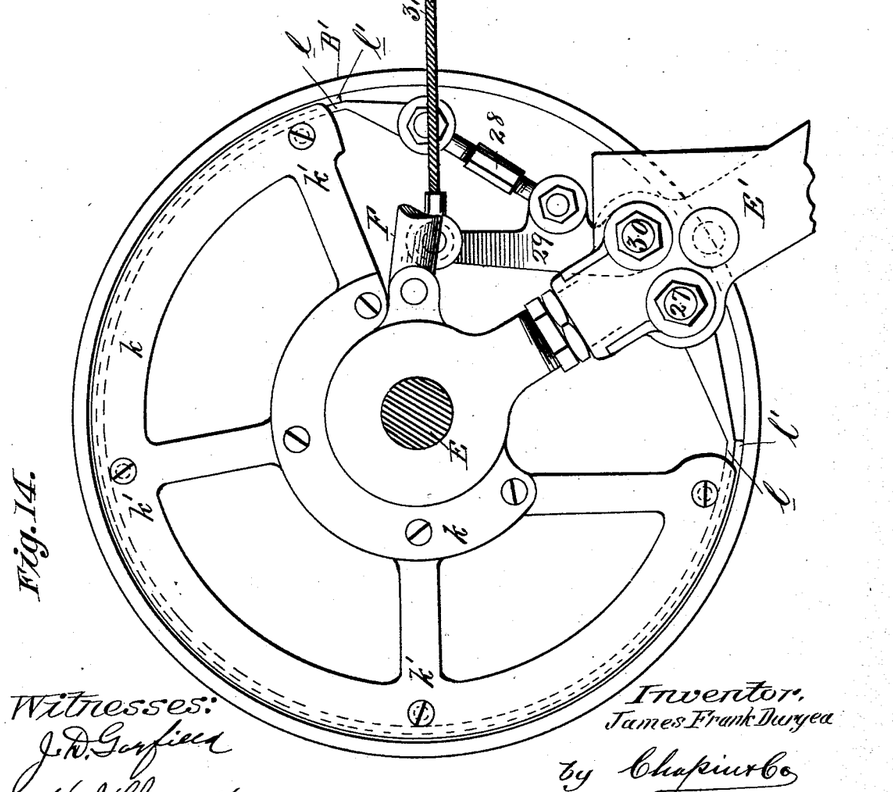
Fig. 14 is a side elevation of the brake, showing the latter set.
Figure 15:
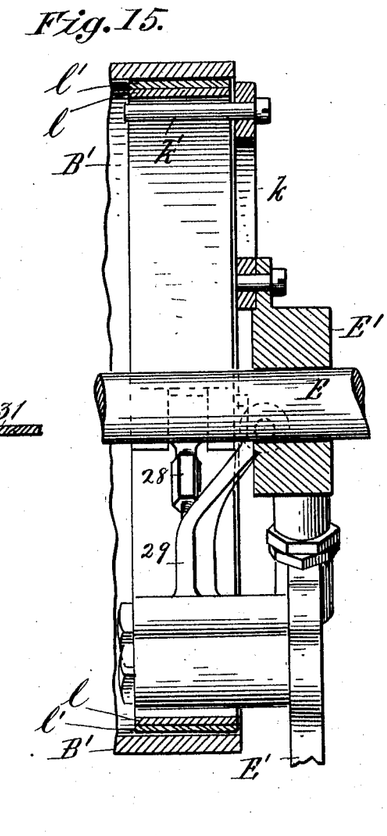
Fig. 15 is a vertical section of the brake.

A brake is provided for the vehicle in the form of an expanding steel band, as clearly illustrated in Figs. 14 and 15. These views show said brake applied to the inside of the pulley B' of the counter-shaft E.

The brake is constructed as follows: On the arm E' is secured by screws or otherwise a segmental frame $k$, the inside surface of which is substantially flush with the end of pulley B' and whose diameter is about that of the inside of said pulley. Fixed in said frame $k$ at intervals and near its periphery are screws $k'$, which project into the pulley B' for a certain distance. These screws $k'$ support the strap $l$, which, with its leather shoe $l'$, constitutes the brake proper. Each end of said strap terminates in an eye, one of which is connected to the bolt 27 and the other end connected to the turnbuckle 28, which, in turn, is connected to the lever 29, hung on the bolt 30. In Fig. 14 the brake is shown set. When it is released, it retracts and is caught by and suspended on the screws $k'$. By referring to the drawings it will be seen that by means of the turnbuckle and its connection with lever 29 and the connection of said lever with bolt 30 a toggle-joint is made, the upper end of lever 29 having attached thereto a flexible connection 31 to a brake-lever operated by the hand or foot of the driver of the vehicle. The three pivoted points from the end of the strap through the turnbuckle to bolt 30 on the arm E' are never allowed to be brought into line, and therefore the retractile force of the steel strap $l$ will always disengage the shoe $l'$ from the inner surface of the pulley B' as soon as the force applied to lever 29, through the flexible connection 31, to apply the brake is removed.

The construction of a brake applied to the inner surface of the pulley B' is exceedingly advantageous inasmuch as it is capable of being boxed in and thus kept free from dust and grit, which would cause rapid wear of the frictional parts thereof.

I reserve the right to embody the means for cooling the cylinders of the driving-engine, consisting of a water-reservoir forming a portion of the back of the seat of the vehicle, combined with suitable connections between the reservoir and engine in another pending application, and for that reason no claim is made thereto in this one.

Having thus described my invention, what I claim, and desire to secure by Letters Patent, is—

1. In a motor-vehicle, a main axle through which the propelling force is conveyed to the wheels thereof, a suitable motor, a main shaft driven by said motor, a cone-pulley fixed on said main shaft, combined with a counter-shaft having a belt-pulley thereon, supported in axial alinement with said main shaft and main axle, gear connections between said counter-shaft and axle, one or more loosely-running driving-belts uniting said cone and counter-shaft pulleys, idler-pulleys applied to said belts, toggle-lever frames supporting said idler-pulleys in pairs in proximity to said belts, a cam-shaft extending across the vehicle near said toggle-frames having cams thereon for engagement with said frames, whereby said idler-pulleys are moved against and from said belts, the operating-lever, and connections between said lever and cam-shaft whereby the latter-named shaft is reciprocally rotated, substantially as set forth.

2. In a motor-vehicle, the combination of a motor and a main shaft driven thereby, supported on the frame of the vehicle, a counter-shaft, suitable belt-pulleys on said two shafts, a driving-axle, supports on said axle for said counter-shaft, braces pivotally connected to said supports by one end, and to the vehicle-frame by their opposite ends, a gear connection between said counter-shaft and driving-axle, and belts for connecting said main shaft and said counter-shaft for reciprocally revolving the latter, substantially as set forth.

3. In a motor-vehicle, the combination of a motor and its main shaft, a counter-shaft driven by belts from said main shaft, said counter-shaft being suitably supported upon, and driving said axle, and a series of idler-pulleys for engagement with said belts, and a cam-shaft for operating said idler-pulleys, a flexible connection between said cam-shaft and the operating-lever of the vehicle for rotating said cam-shaft by vertical movements of said operating-lever, substantially as described.

4. Means for controlling the movements of motor-vehicles consisting of an operating-lever pivotally supported upon a tubular steering-head, for movement in vertical and horizontal planes for respectively controlling the motive force and direction of said vehicle, and a spring-actuated locking-bolt within said operating-lever for securing said lever at different angles in said vertical plane, substantially as set forth.

5. Means for controlling the movements of motor-vehicles consisting of an operating-lever pivotally supported upon a tubular steering-head, for movement in vertical and horizontal planes for respectively controlling the motive force and direction of said vehicle, and a spring-actuated locking-bolt within said operating-lever for securing said lever at different angles in said vertical plane, and a plunger within said steering-head having vertical reciprocating movements imparted thereto by said operating-lever, and a suitable connection between said plunger and the driving mechanism of the vehicle for controlling the latter, substantially as described.

6. Means for controlling the idler-pulleys of belt-driven motor-vehicles, consisting of a cam-shaft for operating said idler-pulleys, said shaft having cams thereon provided with cavities within which said cams are retired by the movement of said shaft in one direction, and means for rigidly supporting said cams when the said shaft is moved in an opposite direction, and means for controlling the reciprocal rotation of said cam-shaft, substantially as set forth.

7. The herein-described brake located and operating on the inside of one of the driving-pulleys, as B', of the motor-vehicle, consisting of the spring-metal strap $l'$, which is normally out of engagement with the said driving-pulley, one end of which is attached to the arm E', at 27, and the opposite free end of which is connected through a turnbuckle 28, to the lever 29, pivotally attached to said arm E', to the upper end of which are secured the flexible connections 31, for forcibly expanding the said strap against the inner surface of said pulley B', substantially as described.

JAMES FRANK DURYEA.

Witnesses:
 WM. H. CHAPIN,
 K. I. CLEMONS.